(12) United States Patent
Fukazawa (10) Patent No.: US 12,257,613 B2
(45) Date of Patent: Mar. 25, 2025

(54) FLAKE-LIKE COMPOSITION AND FLAKE-LIKE COMPOSITION PRODUCTION METHOD

(71) Applicant: Nippon Fiber Corporation, Abiko (JP)

(72) Inventor: Hiroshi Fukazawa, Abiko (JP)

(73) Assignee: NIPPON FIBER CORPORATION, Abiko (JP)

( * ) Notice: Subject to any disclaimer, the term of this patent is extended or adjusted under 35 U.S.C. 154(b) by 0 days.

(21) Appl. No.: 18/020,998

(22) PCT Filed: Jul. 30, 2021

(86) PCT No.: PCT/JP2021/028314
§ 371 (c)(1),
(2) Date: Mar. 6, 2023

(87) PCT Pub. No.: WO2022/034806
PCT Pub. Date: Feb. 17, 2022

(65) Prior Publication Data
US 2023/0294147 A1      Sep. 21, 2023

(30) Foreign Application Priority Data

Aug. 14, 2020   (JP) ................................. 2020-137028

(51) Int. Cl.
*B09B 3/25*    (2022.01)
*B09B 3/35*    (2022.01)
*B09B 3/40*    (2022.01)

(52) U.S. Cl.
CPC ................. *B09B 3/25* (2022.01); *B09B 3/35* (2022.01); *B09B 3/40* (2022.01)

(58) Field of Classification Search
CPC ................ B09B 3/25; B09B 3/35; B09B 3/40
See application file for complete search history.

(56) References Cited

U.S. PATENT DOCUMENTS

2006/0288912 A1*  12/2006  Sun ...................... C04B 40/065
                                                        106/790

FOREIGN PATENT DOCUMENTS

| JP | 07145924 A | * | 6/1995 | ............. Y02E 20/34 |
| JP | 2002336813 A | * | 11/2002 | ............. C04B 18/08 |

OTHER PUBLICATIONS

English-language machine translation of JP 7-145924 A (Year: 1995).*
English-language machine translation of JP 2002-336813 A (Year: 2002).*

* cited by examiner

*Primary Examiner* — James C Goloboy
(74) *Attorney, Agent, or Firm* — Birch, Stewart, Kolasch & Birch, LLP (57) ABSTRACT

The purpose of the present invention is to provide: a flake-like composition that enables effective use of the waste discharged from a coal-fueled thermal power plant; and a method for producing said flake-like composition. This flake-like composition is characterized by containing, as a raw material, waste discharged from a coal-fueled thermal power plant.

6 Claims, 8 Drawing Sheets

|  |  | Example 1 | Example 2 | Example 3 | Example 4 | Example 5 | Example 6 | Example 7 | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|---|---|---|---|---|
| Sample source |  | S1 | S2 | S3 | S4 | S5 | S6 | S7 | S8 | S9 | S10 | S11 | S12 | S13 | S14 |
| Temperature (°C) | Start | 1400 | 1375 | 1375 | 1375 | 1350 | 1375 | 1375 | 1375 | 1375 | 1375 | 1375 | 1375 | 1375 | 1375 |
|  | Final | 1450 | 1450 | 1450 | 1400 | 1400 | 1400 | 1400 | 1400 | 1400 | 1400 | 1400 | 1400 | 1400 | 1400 |
| Heating time (Hours) |  | 1 | 15 | 15 | 8 | 2 | 5 | 5 | 5 | 5 | 5 | 5 | 5 | 5 | 5 |
| Annealing |  | Done | Done | Done | Done | None | Done | Done | Done | Done | Done | Done | Done | Done | Done |
| Annealing temperature(°C) |  | 1400 | 1375 | 1375 | 1375 |  | 1375 | 1375 | 1375 | 1375 | 1375 | 1375 | 1375 | 1375 | 1375 |
| Annealing time(Hours) |  | 1 | 1 | 1 | 1 |  | 1 | 1 | 1 | 1 | 1 | 1 | 1 | 1 | 1 |
| Spinnabilty |  | Good | Good | Good | Good | Poor | Good | Poor | Poor | Poor | Poor | Poor | Poor | Poor | Poor |
| Flake workability |  | Good | Good | Good | Good | Good | Good | Good | Poor | Poor | Poor | Poor | Poor | Poor | Poor |

Fig. 1

|  | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| IGCC slag | 20 | 50 | 75 | 90 | 90 |  | 30 | 50 | 20 | 25 |  | 10 | 25 |  |
| BA1 | 10 |  |  |  |  |  | 5 |  |  |  |  |  |  |  |
| FA1 | 40 |  |  |  |  |  |  |  |  |  |  |  |  |  |
| FA2 | 30 | 50 | 25 | 10 | 10 |  | 15 |  | 10 |  |  | 16 |  |  |
| FA3 |  |  |  |  |  |  |  |  | 30 |  | 70 | 36 |  |  |
| FA4 |  |  |  |  |  |  |  | 50 | 40 | 10 | 10 |  | 10 | 7 |
| FA5 |  |  |  |  |  | 100 |  |  |  |  |  |  |  | 18 |
| FA6 |  |  |  |  |  |  |  |  |  | 65 | 10 | 37 | 65 |  |
| FA7 |  |  |  |  |  |  | 50 |  |  |  | 10 |  |  |  |
| FA8 |  |  |  |  |  |  |  |  |  |  |  |  |  | 75 |

Fig.2

| | IGCC | BA1 | FA1 | FA2 | FA3 | FA4 | FA5 | FA6 | FA7 | FA8 |
|---|---|---|---|---|---|---|---|---|---|---|
| $Fe_2O_3$ [F] | 9 | 19 | 13 | 55 | 2 | 97 | 21 | 1 | 1 | 0 |
| $SiO_2$ [S] | 54 | 46 | 57 | 35 | 62 | 0 | 35 | 73 | 19 | 34 |
| Al2O3 [A] | 11 | 11 | 17 | 5 | 27 | 0 | 12 | 22 | 17 | 13 |
| CaO [C] | 17 | 17 | 6 | 2 | 3 | 0 | 22 | 0 | 55 | 42 |
| Others | 9 | 6 | 7 | 3 | 5 | 3 | 10 | 4 | 8 | 11 |

Fig. 3

| Constituent | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| $Fe_2O_3$ [F] | 26 | 32 | 21 | 14 | 14 | 21 | 12 | 6 | 47 | 13 | 12 | 11 | 13 | 11 |
| $SiO_2$ [S] | 49 | 45 | 49 | 52 | 52 | 35 | 33 | 58 | 33 | 61 | 53 | 60 | 61 | 32 |
| $Al2O3$ [A] | 12 | 8 | 10 | 10 | 10 | 12 | 13 | 19 | 11 | 17 | 23 | 20 | 17 | 12 |
| $CaO$ [C] | 8 | 10 | 13 | 16 | 16 | 22 | 34 | 10 | 5 | 5 | 8 | 3 | 5 | 36 |
| Others | 6 | 6 | 8 | 8 | 8 | 10 | 8 | 7 | 4 | 4 | 4 | 6 | 4 | 9 |

| | | | Example 1 | Example 2 | Example 3 | Example 4 | Example 5 | Example 6 | Example 7 | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|---|---|---|---|---|---|
| Sample source | | | S1 | S2 | S3 | S4 | S5 | S6 | S7 | S8 | S9 | S10 | S11 | S12 | S13 | S14 |
| Temperature (°C) | Start | | 1400 | 1375 | 1375 | 1375 | 1350 | 1375 | 1375 | 1375 | 1375 | 1375 | 1375 | 1375 | 1375 | 1375 |
| | Final | | 1450 | 1450 | 1450 | 1400 | 1400 | 1400 | 1400 | 1400 | 1400 | 1400 | 1400 | 1400 | 1400 | 1400 |
| Heating time (Hours) | | | 1 | 15 | 15 | 8 | 2 | 5 | 5 | 5 | 5 | 5 | 5 | 5 | 5 | 5 |
| Anealing | | | Done | Done | Done | Done | None | Done | Done | Done | Done | Done | Done | Done | Done | Done |
| Annealing temperature(°C) | | | 1400 | 1375 | 1375 | 1375 | | 1375 | 1375 | 1375 | 1375 | 1375 | 1375 | 1375 | 1375 | 1375 |
| Annealing time (Hours) | | | 1 | 1 | 1 | 1 | | 1 | 1 | 1 | 1 | 1 | 1 | 1 | 1 | 1 |
| Spinnability | | | Good | Good | Good | Good | Poor | Good | Poor | Poor | Poor | Poor | Poor | Poor | Poor | Poor |
| Flake workability | | | Good | Good | Good | Good | Good | Good | Good | Poor | Poor | Poor | Poor | Poor | Poor | Poor |

| Profile | Example 1 | Example 2 | Example 3 | Example 4 | Example 5 | Example 6 | Example 7 | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|---|---|---|---|
| Sample source | S1 | S2 | S3 | S4 | S5 | S6 | S7 | S8 | S9 | S10 | S11 | S12 | S13 | S14 |
| [S]+[A] | 61 | 53 | 59 | 63 | 63 | 47 | 46 | 77 | 44 | 78 | 76 | 80 | 78 | 44 |
| [A]/([A]+[S]) | 0.20 | 0.15 | 0.16 | 0.17 | 0.17 | 0.26 | 0.28 | 0.25 | 0.25 | 0.22 | 0.30 | 0.25 | 0.22 | 0.27 |
| [C] | 8 | 10 | 13 | 16 | 16 | 22 | 34 | 10 | 5 | 5 | 8 | 3 | 5 | 36 |

Fig. 8

FLAKE-LIKE COMPOSITION AND FLAKE-LIKE COMPOSITION PRODUCTION METHOD

TECHNICAL FIELD

The present invention relates to a flake-like composition and a method for producing a flake-like composition.

BACKGROUND ART

After the Great East Japan Earthquake, thermal power generation has accounted for an increasing share of energy supply due to the limited operation of nuclear reactors.

As thermal power generation, there are those that generate electricity using coal as fuel. Such coal-fueled thermal power generation plants include, for example, coal-fired thermal power plants, fluidized bed combustion furnaces, the IGCC power plant which adopt Integrated coal Gasification Combined Cycle (known as IGCC and referred to hereinafter as well). Here, in IGCC power plant, electric power is obtained by driving a gas turbine using coal gasified gas as fuel, and steam is generated by recovering the exhaust heat of the gas turbine, and the generated steam is used to drive the steam turbine to obtain electric power.

However, with regard to the effective use of waste material discharged from the above various coal-fueled thermal power plants, an effective utilization has not been established other than pulverizing the waste material to be used as a cement aggregate (see Patent Document 1).

PRIOR ART LIST

Patent Document

Patent Document 1: JP 2017-014052

DISCLOSURE OF THE INVENTION

Problem to be Solved by the Invention

In view of the above problems, this invention is intended to provide a flake-like composition and a method for producing a flake-like composition by effectively utilizing waste material discharged from coal-fueled thermal power plants.

Means for Solving the Problem

In order to solve the above problems, a flake-like composition according to the present invention includes waste material discharged from a coal-fueled thermal power plant as a raw material.

Effect of the Invention

Thus present invention achieves more effective use of the waste material discharged from a coal-fueled thermal power plant than ever before.

MODES(S) FOR CARRYING OUT THE INVENTION

The inventor formerly performed an experiment to produce fiber from a raw material containing waste material in order to effectively use waste material discharged from coal-fueled thermal power plants. In preparation of the fiber, a raw material containing waste material was charged in a tammann tube suspended in an electric furnace, and the raw material was melted at a predetermined temperature. Thereafter, fiber was prepared by finely pulling out the melt (the raw material melted) flowing out of the hole (diameter 2 mm~3 mm) provided in the center of the bottom of the tammann tube.

During the course of melting the raw material in this manner, when the melt solidifies into a spherical material, it was found that the spherical material could be crushed into a flat or scale-like shape by blow using a hammer. The present invention was established based on this finding.

In the following description, the term melt spinning refers to a method in which a melt of a raw material is melted by heat and discharged from a hole (through hole) to form fibers, and then cooled and solidified. Further, spinnability refers to the characteristic that a fiber is generated by the melt falling into a fiber shape from the hole (diameter 2 mm~3 mm), or by pulling the rod (which is sticked to the melt by inserting a rod in the melt through the hole) away from the hole.

In the present embodiment, the flake-like composition refers to flat or scale-like composition. In consideration of the application of the flake-like composition (for example, a bright pigment, paint, lining, dressing material or reinforcing material), the thickness of the flake-like composition is in the range of 1 µm~80 µm, and the length of the long side is preferably in the range of 5 µm~1200 µm. Here, the thickness of the flake-like composition refers to the thickness of the thickest part of the flake-like composition. The long side of the flake-like composition refers to the length of the long side of the rectangular flake-like composition. The method for measuring the thickness and long side of the flake-like composition will also be described in FIG. 8.

Further, the term flake workability refers to the characteristic that the spherical solidified material, which is obtainable by eluting the melt from the pore (diameter 2 mm~3 mm) and solidifying the melt, is easily crushed into a flake shape by blow.

In the following description, $Fe_2O_3$ is referred to as the F component, and the content of $Fe_2O_3$ is also described as [F]. $SiO_2$ is referred to as the S component, and the content of $SiO_2$ is also described as [S]. $Al_2O_3$ is referred to as the A component, and the content of $Al_2O_3$ is also described as

[A]. CaO is referred to as the C component, and the content of CaO is also described as [C].

Embodiment

The raw material for producing the flake-like composition according to the present embodiment includes waste material discharged from a coal-fueled thermal power plant. Here, thermal power plants include coal-fired thermal power plants, fluidized-bed combustion reactors, IGCC power plant.

The raw material of the flake-like composition is mainly composed of $SiO_2$ and $Al_2O_3$, and the ratio of $Al_2O_3$ to the total of $SiO_2$ and $Al_2O_3$ in the raw material is within a specific range, and further contains a specific amount of CaO.

The raw material of the flake-like composition according to the present embodiment preferably has a total content of $SiO_2$ and $Al_2O_3$ of 45% by mass or more and 75% by mass or less, and more preferably 46% by mass or more and 63% by mass or less. When the sum of [S] and [A] is less than 45% by mass or more than 75% by mass, the melting temperature of the raw material increases, or the viscosity of the melt increases, thus the melt becomes difficult to flow out from the hole (diameter 2 mm~3 mm) at the bottom of the tammann tube leading to failure to obtain the flake-like composition.

If the components in the raw material are blended so as to satisfy the above-described compositional conditions, a flake-like composition of the present embodiment can be obtained without restriction on the origin of the raw material. As the raw material for the flake-like composition of the present embodiment, waste material discharged from a coal-fueled thermal power plant (for example, a coal-fired thermal power plant, a fluidized-bed combustion furnace, a coal gasification combined cycle power plant (IGCC), etc.) is preferably used. Since the waste material discharged from the coal-fueled thermal power plant contains $Fe_2O_3$, $Al_2O_3$, and $SiO_2$ as the main components, it is suitable for obtaining a flake-like composition of the present embodiment.

The flake-like composition according to the present embodiment does not exclude that it contains unavoidable impurities. Examples of such impurities include MgO, $Na_2O$, $K_2O$, $TiO_2$, $CrO_2$ and the like.

In the present embodiment, there is no substantial difference between the component ratio (mass ratio) of the formulated raw material mixture and the component ratio (mass ratio) of the flake-like composition produced by melting the raw material mixture. For this reason, the component ratio of the raw material mixture can be regarded as the component ratio of the flake-like composition produced by melting the raw material mixture.

The flake-like composition according to the present embodiment is highly amorphous. For this reason, the flake-like composition has almost no strength decrease which is attributable to delamination of the crystalline phase-amorphous phase interface.

Here, the degree of amorphization, which is a measure of amorphousness, is calculated by the following equation (1) by the X-ray diffraction (XRD) spectrum.

$$\text{Degree of amorphousness (\%)} = [I_a/(I_a+I_c)] \times 100 \quad (1)$$

In the above formula (1), $I_a$ and $I_c$ are as follows, respectively.

$I_a$: The integral value of the scattering intensity of the amorphous halo.

$I_c$: Integral value of the scattering intensity of crystalline peaks when X-ray diffraction analysis is performed on the flake-like composition.

The degree of amorphization of the flake-like composition according to the present embodiment may vary depending on the composition of the flake-like composition; however, the degree of amorphization usually presents a value of 90% or higher. The degree of amorphization of the flake-like composition even reaches as high as 95% or higher in some cases, and in case where the degree of amorphization is the highest, the flake-like composition is substantially composed only of a non-crystalline phase. Here, being substantially composed only of a non-crystalline phase implies that only the amorphous halo is recognized in the X-ray diffraction spectrum, and a peak for a crystalline material was not recognized.

EXAMPLES

In the following Examples, mixtures obtained by mixing waste materials discharged from coal-fueled thermal power plants, at predetermined mixing ratios (% by mass), were prepared as raw materials of flake-like compositions (since the numbers after the decimal point are rounded off, the sum may not necessarily add up to 100%). The mixing ratio of each of raw materials S1 to S14 will be described below with reference to FIG. 1. Incidentally, in FIG. 1, the IGCC slag indicates a waste material from a domestic IGCC power plant, and FA1 to FA8 indicate waste materials from domestic coal-fired power plants (FA1 to FA8 are waste materials discharged from different power plants). Furthermore, BA1 indicates basalt (basalt).

The raw material S1 is mixed at a ratio of 20% by mass of waste material (IGCC slag) from the IGCC power plant, 10% by mass of basalt (BA1), 40% by mass of waste material (FA1) from the coal-fired power plant FA1, and 30% by mass of waste material (FA2) from the coal-fired power plant FA2.

The raw material S2 is mixed at a ratio of 50% by mass of waste material (IGCC slag) from the IGCC power plant and 50% by mass of waste material (FA2) from the coal-fired power plant FA2.

The raw material S3 is mixed at a ratio of 75% by mass of waste material (IGCC slag) from the IGCC power plant and 25% by mass of waste material (FA2) from the coal-fired power plant FA2.

The raw material S4 is mixed at a ratio of 90% by mass of waste material (IGCC slag) from the IGCC power plant and 10% by mass of waste material (FA2) from the coal-fired power plant FA2.

The raw material S5 is mixed at a ratio of 90% by mass of waste material (IGCC slag) from the IGCC power plant and 10% by mass of waste material (FA2) from the coal-fired power plant FA2.

The raw material S6 is waste material (FA5) from the coal-fired power plant FA5.

The raw material S7 is 30% by mass of waste material (IGCC slag) from the IGCC power plant, 5% by mass of basalt, 15% by mass of waste material from the coal-fired power plant FA2, and 50% by mass of waste material from the coal-fired power plant FA7.

The raw material S8 is mixed at a ratio of 50% by mass of waste material (IGCC slag) from the IGCC power plant and 50% by mass of waste material from the coal-fired power plant FA3.

The raw material S9 is 20% by mass of waste material (IGCC slag) from the IGCC power plant, 10% by mass of waste material from the coal-fired power plant FA2, 30% by mass of waste material from the coal-fired power plant FA3, and 40% by mass of waste material from the coal-fired power plant FA4.

The raw material S10 is mixed at a ratio of 25% by mass of waste material (IGCC slag) from the IGCC power plant, 10% by mass of waste material from the coal-fired power plant FA4, and 65% by mass of waste material from the coal-fired power plant FA6.

The raw material S11 contains 70% by mass of waste material from the coal-fired power plant FA3, 10% by mass of waste material from the coal-fired power plant FA4, 10% by mass of waste material from the coal-fired power plant FA6, and 10% by mass of waste material discharged from the coal-fired power plant FA7.

The raw material S12 is 10% by mass of waste material (IGCC slag) from the IGCC power plant, 16% by mass of waste material from the coal-fired power plant FA2, 36% by mass of waste material from the coal-fired power plant FA3, and 37% by mass of waste material from the coal-fired power plant FA6.

The raw material S13 is mixed at a ratio of 25% by mass of waste material (IGCC slag) from the IGCC power plant, 10% by mass of waste material (FA4) discharged from the coal-fired power plant FA4, and 65% by mass of waste material (FA6) discharged from the coal-fired power plant FA6.

The raw material S14 is mixed at a ratio of 7% by mass of waste material (FA4) from the coal-fired power plant FA4, 18% by mass of waste material (FA5) from the coal-fired power plant FA5, and 75% by mass of waste material (FA8) from the coal-fired power plant FA8.

Figure 2:
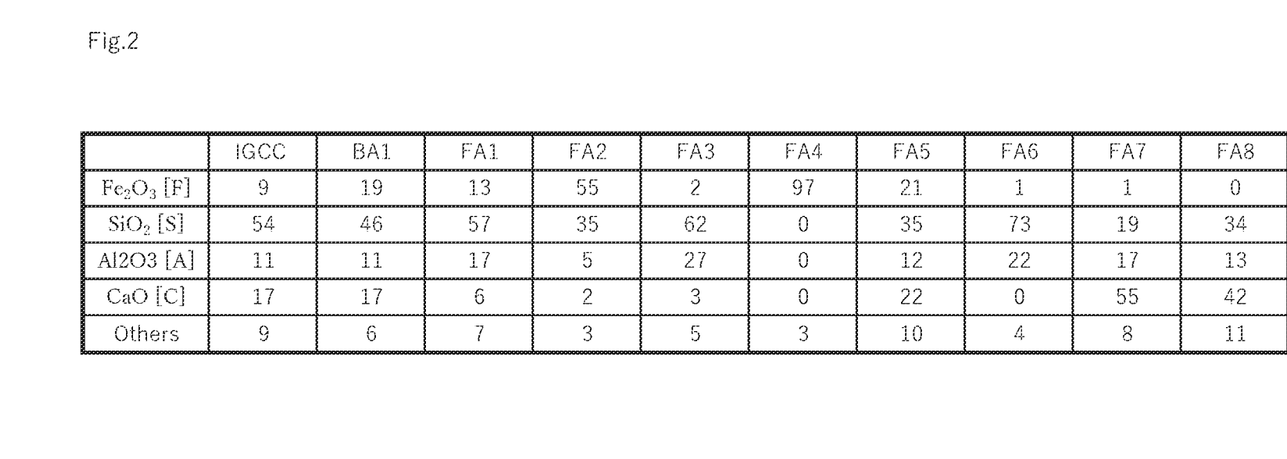
FIG. 2 summarizes in table the component composition ([F], [S], [A], [C], and others) in the raw materials.

In the Examples, the components of the raw materials were analyzed by fluorescent X-ray analysis. For the analysis Japan Philips Inc.'s X-ray fluorescence analyzer (Philips PW2404) was used using the sample chamber of the X-ray fluorescence analyzer in a vacuum. FIG. 2 shows the component composition of the raw materials (the total is not necessarily 100 because the value after the decimal point is rounded). In the following, 0% by mass is a measurably small amount, and does not mean that it is strictly "0".

The composition of the waste material (IGCC slag) from the Integrated Coal Gasification Combined Cycle (IGCC) is 9% by mass of [F], 54% by mass of [S], 11% by mass of [A], 17% by mass of [C], and 9% by mass of others.

The composition of Basalt (BA1) is 19% by mass of [F], 46% by mass of [S], 11% by mass of [A], 17% by mass of [C], and 6% by mass of others.

The composition of the waste material (FA1) from a domestic coal-fired power plant FA1 is 13% by mass of [F], 57% by mass of [S], 17% by mass of [A], 6% by mass of [C], and 7% by mass of others.

The composition of the waste material (FA2) from a domestic coal-fired power plants FA2 is 55% by mass of [F], 35% by mass of [S], 5% by mass of [A], 2% by mass of [C], and 3% by mass of others.

The composition of the waste material (FA3) from a domestic coal-fired power plant FA3 is 2% by mass of [F], 62% by mass of [S], 27% by mass of [A], 3% by mass of [C], and 5% by mass of others.

The composition of the waste material (FA4) from a domestic coal-fired power plant FA4 is 97% by mass of [F], 0% by mass of [S], 0% by mass of [A], 0% by mass of [C], and 3% by mass of others.

The composition of the waste material (FA5) from a domestic coal-fired power plant FA5 is 21% by mass of [F], 35% by mass of [S], 12% by mass of [A], 22% by mass of [C], and 10% by mass of others.

The composition of the waste material (FA6) from a domestic coal-fired power plant FA6 is 1% by mass of [F], 73% by mass of [S], 22% by mass of [A], 0% by mass of [C], and 4% by mass of others.

The composition of the waste material (FA7) from a domestic coal-fired power plant FA7 is 1% by mass of [F], 19% by mass of [S], 17% by mass of [A], 55% by mass of [C], and 8% by mass of others.

The composition of the waste material (FA8) from a domestic coal-fired power plant FA8 is 0% by mass of [F], 34% by mass of [S], 13% by mass of [A], 42% by mass of [C], and 11% by mass of others.

Figure 1:
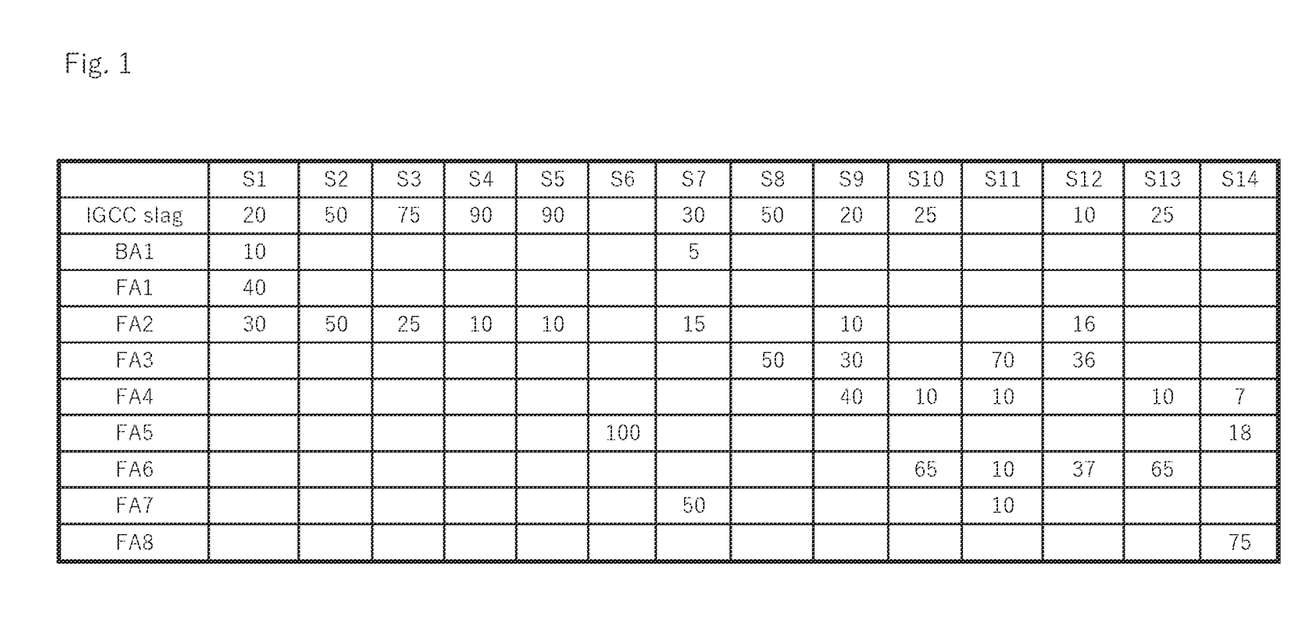
FIG. 1 summarizes in table a mixing ratio (% by mass) of raw materials in preparing raw materials S1 to S14.
Figure 3:
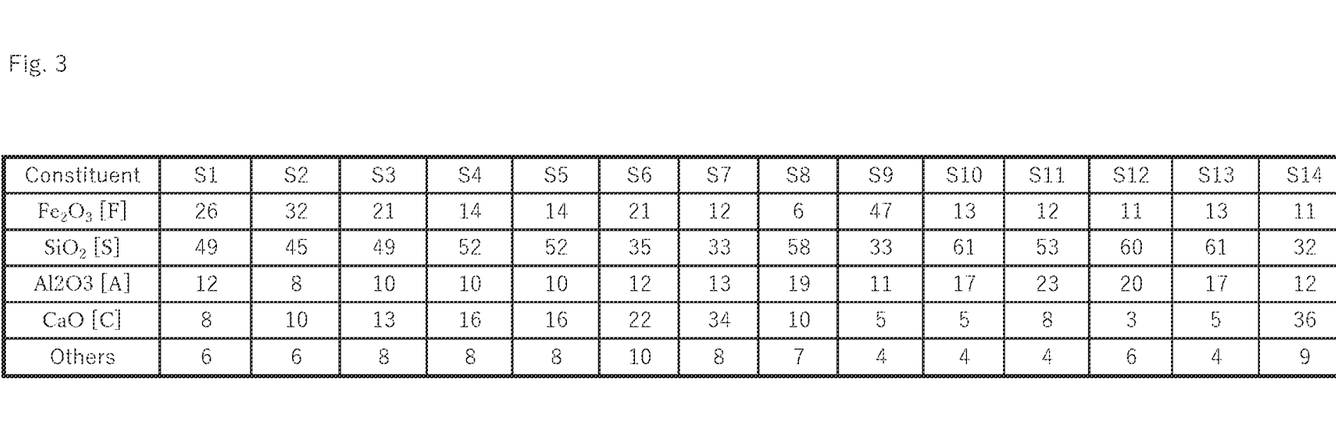
FIG. 3 summarizes in table the component composition ([F], [S], [A], [C], and others) in raw materials.

FIG. 3 summarize the component composition of the raw materials S1-S14 used in Examples. The component composition was calculated from the mixing ratio as shown in FIG. 1 and the component composition of the raw materials in FIG. 2. Note that since the decimal point is rounded, the total is not necessarily 100%.

The raw material S1 consists of 26% by mass of [F], 49% by mass of [S], 12% by mass of [A], 8% by mass of [C], and 6% by mass of others.

The raw material S2 consists of 32% by mass of [F], 45% by mass of [S], 8% by mass of [A], 10% by mass of [C], and 6% by mass of others.

The raw material S3 consists of 21% by mass of [F], 49% by mass of [S], 10% by mass of [A], 13% by mass of [C], and 8% by mass of others.

The raw material S4 consists of 14% by mass of [F], 52% by mass of [S], 10% by mass of [A], 16% by mass of [C], and 8% by mass of others.

The raw material S5 consists of 14% by mass of [F], 52% by mass of [S], 10% by mass of [A], 16% by mass of [C], and 8% by mass of others.

The raw material S6 consists of 21% by mass of [F], 35% by mass of [S], 12% by mass of [A], 22% by mass of [C], and 10% by mass of others.

The raw material S7 consists of 12% by mass of [F], 33% by mass of [S], 13% by mass of [A], 34% by mass of [C], and 8% by mass of others.

The raw material S8 consists of 6% by mass of [F], 58% by mass of [S], 19% by mass of [A], 10% by mass of [C], and 7% by mass of others.

The raw material S9 consists of 47% by mass of [F], 33% by mass of [S], 11% by mass of [A], 5% by mass of [C], and 4% by mass of others.

The raw material S10 consists of 13% by mass of [F], 61% by mass of [S], 17% by mass of [A], 5% by mass of [C], and 4% by mass of others.

The raw material S11 consists of 12% by mass of [F], 53% by mass of [S], 23% by mass of [A], 8% by mass of [C], and 4% by mass of others.

The raw material S12 consists of 11% by mass of [F], 60% by mass of [S], 20% by mass of [A], 3% by mass of [C], and 6% by mass of others.

The raw material S13 consists of 13% by mass of [F], 61% by mass of [S], 17% by mass of [A], 5% by mass of [C], and 4% by mass of others.

The raw material S14 consists of 11% by mass of [F], 32% by mass of [S], 12% by mass of [A], 36% by mass of [C], and 9% by mass of others.

Figure 4:
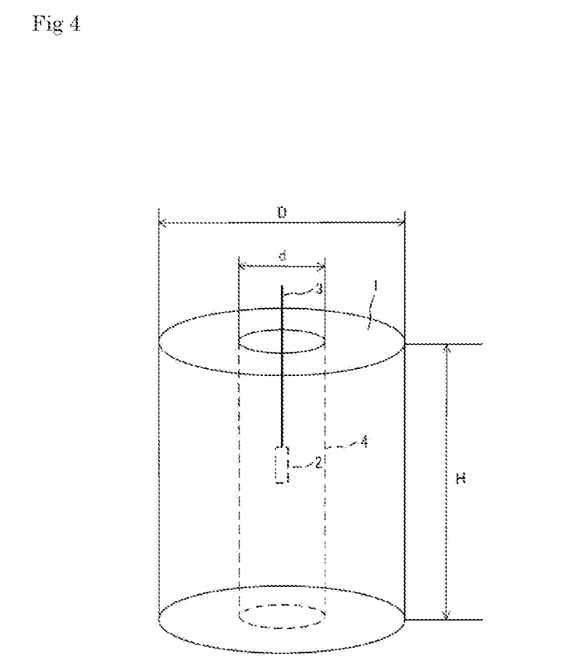
FIG. 4 shows an outline of an electric furnace used in preparing a flake-like composition according to the Examples.

FIG. 4 is a diagram showing an outline of the electric furnace(1) used in obtaining a flake-like composition from the raw material according to the examples. The electric furnace(1) is of a cylindrical body having a height(H) of 60 cm and an outer diameter(D) of 50 cm in which a through hole(4) having an inner diameter d of 10 cm is formed in the center. In the through hole(4), a tammann tube(2) having an inner diameter of 2.1 cm and a length of 10 cm is suspended by the suspension rod(3). The tammann tube(2) is charged with any of the raw materials S1-S14. A hole having a diameter of 2 mm is provided in the center of the bottom of the tammann tube(2), and when the raw material S1-S14 is melted by heating, the melt flows out from the hole provided at the bottom of the tammann tube(2) by gravity. The outflowed melted raw material is cooled and solidified in contact with the outside air. Since the molten raw material (hereinafter also referred to as the melt) flowing out from the bottom of the tammann tube(2) is solidified rapidly, the solids are substantially amorphous.

The electric furnace(1) is heated by a predetermined temperature raising program, but it is confirmed in advance that the temperature (° C.) of the melt in the tammann tube(2) follows at a temperature substantially 50° C. lower than the temperature inside the furnace.

Figure 5:
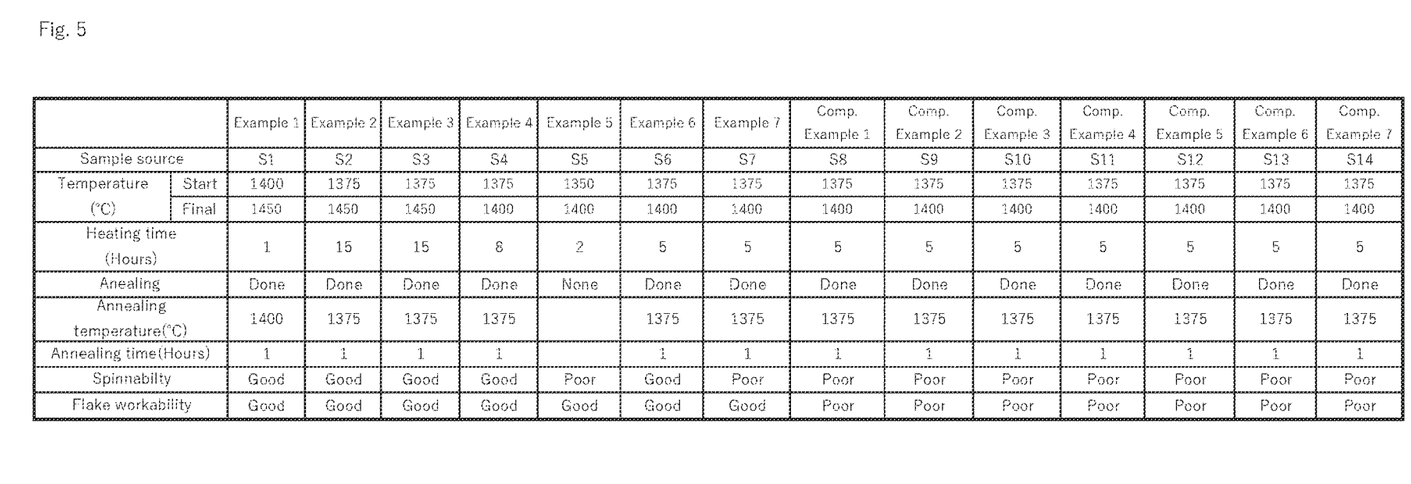
FIG. 5 summarizes in table the temperature conditions and experimental results on spinnability and flake workability in the Examples.
Figure 6:
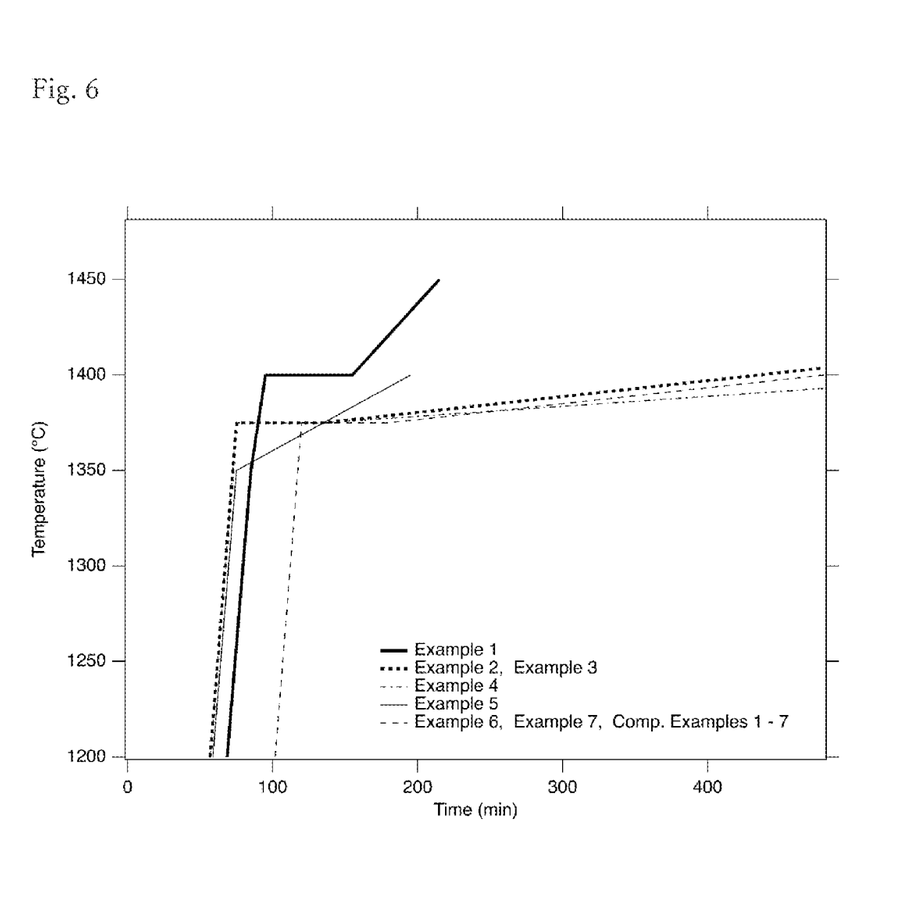
FIG. 6 is a graph showing the temperature profile in performing experiment according to Examples.

FIG. 5 summarize the temperature conditions and experimental results of spinnability and flake workability when the raw materials S1-S14 are melted in an electric furnace(1). FIG. 6 shows the temperature profile over time when the raw materials S1-S14 is melted in an electric furnace(1).

Example 1

After the raw material S1 was charged in the tammann tube(2), the temperature in the furnace(1) was raised from room temperature (25° C.) to about 1400° C. (raw material temperature 1350° C.), and then held at about 1400° C. for 1 hour (annealing treatment). Thereafter, the temperature inside the furnace(1) was raised from about 1400° C. (raw material temperature 1350° C.) to about 1450° C. (raw material temperature 1400° C.) over an hour, and the melt was discharged from the hole provided at the bottom of the tammann tube(2) by gravity. The discharged dropping melt first solidified into spherical solid material, and subsequently fell into a fiber shape to produce fibers (Good spinnability). A flake-like composition was obtained by crushing the spherical solid material by striking with an iron hammer (Good flake workability). In the following example 2~7 below, workability into flake was tested likewise.

Example 2

After the raw material S2 was charged in the tammann tube(2), the temperature inside the furnace(1) was raised from room temperature(25° C.) to about 1375° C. (raw material temperature(1325° C.), and then held at about 1375° C. for 1 hour (annealing treatment). Thereafter, the temperature inside the furnace(1) was raised from about 1375° C. (raw material temperature 1325° C.) to about 1450° C. (raw material temperature 1400° C.) over 15 hours, and the melt was discharged from the hole provided at the bottom of the tammann tube(2) by gravity. The discharged dropping melt first solidified into spherical solid material, and subsequently fell into a fiber shape to produce fibers (Good spinnability). A flake-like composition was obtained by crushing the spherical solid material by striking with an iron hammer (Good flake workability).

Example 3

After the raw material S3 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the temperature inside the furnace(1) was raised from about 1375° C. (raw material temperature 1325° C.) to about 1450° C. (raw material temperature 1400° C.) over 15 hours, and the melt was discharged from the hole provided at the bottom of the tammann tube(2) by gravity. The discharged dropping melt first solidified into spherical solid material, and subsequently fell into a fiber shape to produce fibers (Good spinnability). A flake-like composition was obtained by crushing the spherical solid material by striking with an iron hammer (Good flake workability).

Example 4

After the raw material S4 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the temperature inside the furnace(1) was raised from about 1375° C. (raw material temperature 1325° C.) to about 1400° C. (raw material temperature 1350° C.) over 8 hours, and the melt flowed out from the hole provided at the bottom of the tammann tube(2) by gravity. The discharged dropping melt first solidified into spherical solid material, and subsequently fell into a fiber shape to produce fibers (Good spinnability). A flake-like composition was obtained by crushing the spherical solid material by striking with an iron hammer (Good flake workability).

Example 5

After the raw material S5 was charged in the tammann tube(2), the temperature inside the furnace(1) was raised from room temperature (25° C.) to about 1350° C. (raw material temperature 1300° C.). Thereafter, the temperature inside the furnace(1) was raised from about 1350° C. (raw material temperature 1300° C.) to about 1400° C. (raw material temperature 1350° C.) taking 2 hours and the melt flowed out from the hole provided at the bottom of the tammann tube(2) by gravity. The discharged dropping melt first solidified into spherical solid material continuously and did not solidify into a fiber shape (Poor spinnability). A flake-like composition was obtained by crushing the spherical solid material by striking with an iron hammer (Good flake workability).

Example 6

After the raw material S6 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was discharged from the hole provided at the bottom of the tammann tube(2) by gravity. From the hole provided in the center of the bottom of the tammann tube, the melt first solidified into spherical material, and the melt subsequently fell into a fiber shape to produce fibers (Good spinnability). A flake-like composition was obtained by crushing the spherical solid material by striking with an iron hammer (Good flake workability).

Example 7

After the raw material S7 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was discharged from the hole provided at the bottom of the tammann tube by gravity. The discharged dropping melt solidified into spherical solid material continuously and did not solidify into a fiber shape (Poor spinnability). A flake-like composition was obtained by crushing the spherical solid material by striking with an iron hammer (Good flake workability).

Comparative Example 1

After the raw material S8 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was tried to discharge from the hole by gravity. The melt did not solidify into spherical material (Poor flake workability) and the melt did not fall into the fiber (Poor spinnability).

Comparative Example 2

After the raw material S9 was charged in the tammann tube(2), the temperature in the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was tried to discharge from the hole by gravity. The melt did not solidify into spherical material (Poor flake workability) and the melt did not fall into the fiber (Poor spinnability).

Comparative Example 3

After the raw material S10 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was tried to discharge from the hole by gravity. The melt did not solidify into spherical material (Poor flake workability) and the melt did not fall into the fiber (Poor spinnability).

Comparative Example 4

After the raw material sample S11 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was tried to discharge from the hole by gravity. The melt did not solidify into spherical material (Poor flake workability) and the melt did not fall into the fiber (Poor spinnability).

Comparative Example 5

After the raw material sample S12 was charged in the tammann tube(2), the temperature inside the furnace(1) was raised from room temperature (25° C.) to about 1375° C. (raw material temperature 1325° C.), and then held at about 1375° C. for 1 hour (annealing treatment). Thereafter, the furnace temperature was raised from about 1375° C. (raw material temperature 1325° C.) to about 1400° C. (raw material temperature 1350° C.) over 5 hours, and the melt was tried to discharge from the hole by gravity. The melt did not solidify into spherical material (Poor flake workability) and the melt did not fall into the fiber (Poor spinnability).

Comparative Example 6

After the raw material sample S13 was charged in the tammann tube(2), the temperature inside the furnace(1) was raised from room temperature (25° C.) to about 1375° C. (raw material temperature 1325° C.) and then held at about 1375° C. for 1 hour (annealing treatment). The temperature inside the furnace(1) was then increased from about 1375° C. (raw material temperature: 1325° C.) to about 1400° C. (raw material temperature: 1350° C.) over a period of 5 hours, and the melt was tried to discharge from the hole by gravity. The melt did not solidify into spherical material (Poor flake workability) and the melt did not fall into the fiber (Poor spinnability).

Comparative Example 7

After the raw material sample S14 was charged in the tammann tube(2), the temperature inside the furnace(1) was raised from room temperature (25° C.) to about 1375° C. (raw material temperature 1325° C.) and then held at about 1375° C. for 1 hour (annealing treatment). The temperature in the furnace was then increased from about 1375° C. (raw material temperature: 1325° C.) to about 1400° C. (raw material temperature:1350° C.) over a period of 5 hours, and the melt was tried to discharge from the hole by gravity. The melt did not solidify into spherical material (Poor flake workability) and the melt did not fall into the fiber (Poor spinnability).

As described above, in Examples 1-7 (raw materials S1-S7), flake workability was good, in other words, a flake-like composition could be obtained, while in Comparative Examples 1-7 (raw materials S8-S14), flake workability was poor, in other words, a flake-like composition could not be obtained.

It was noted that a flake-like composition is obtained in Example 5 where no annealing treatment was performed, whereas any flake-like composition was not obtained in Comparative Example 1 to 7 where annealing treatment is performed. This indicates that, in contrast to the case to obtain fiber, annealing is not necessary to obtain flake-like compositions.

Figure 7:
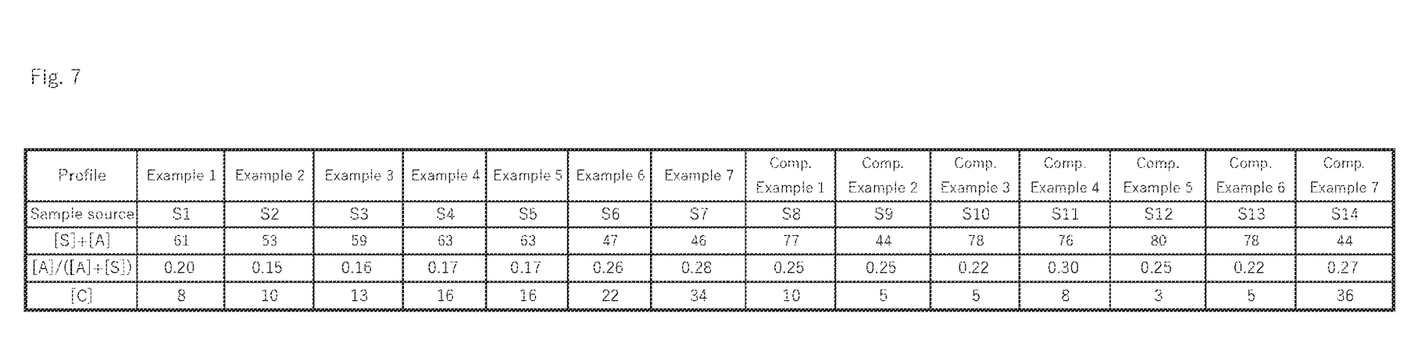
FIG. 7 summarizes in table the component composition of samples S1 to S14 used in Examples.

FIG. 7 summarize such component composition as [S]+[A], [A]/([A]+[S]), [C] of the raw material mixtures of S1 to S14. In order to fabricate flake-like composition a total content of $SiO_2$ and $Al_2O_3$ ([S]+[A]) in the raw material mixture should preferably be between 45 and 75% by mass, and more preferably between 46 and 63% by mass. As to the ratio of $Al_2O_3$ to the sum of $SiO_2$ and $Al_2O_3$ ([A]/([A]+[S]) (mass ratio), 0.15 to 0.28 is preferable. Preferred CaO content([C]) in the raw material mixture is from 8 to 36% by mass.

Figure 8:
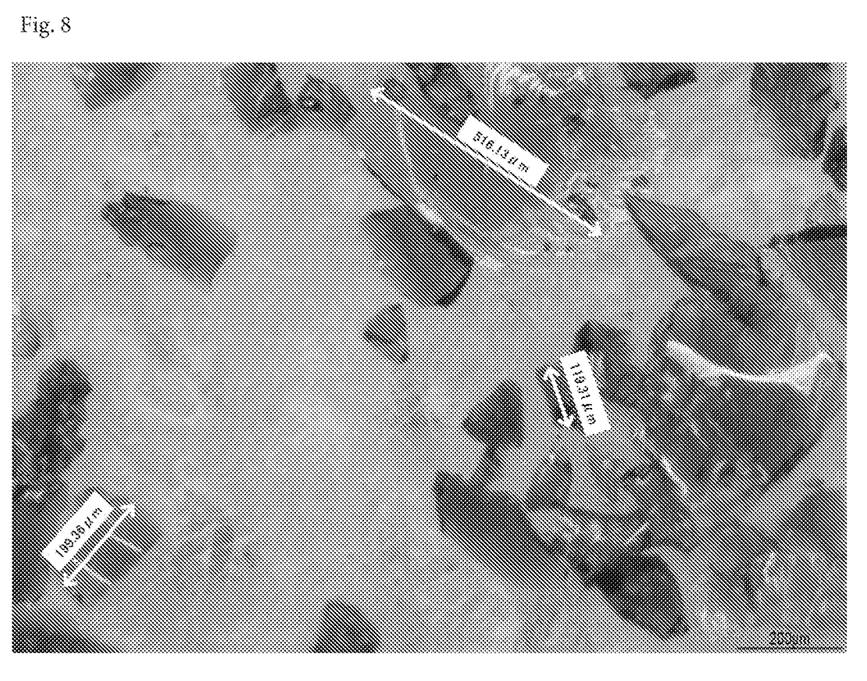
FIG. 8 is an enlarged view (micrograph) of a flake-like composition obtained according to the Examples.

FIG. 8 is a magnified view (micrograph) of the flake-like compositions obtained from the raw materials in the Examples. The thickness and the length of the long sides of the flake-like compositions obtained in Examples 1-8 were measured under a microscope. Here, the flake-like compositions are quasi-rectangular in plan view, and the thickness and length of the long sides of the flake-like compositions are measured visually with an ocular micrometer installed in the microscope. Here, the thickness of the flake composition was measured at the thickest point of the flake composition as the thickness of the flake composition. As the length of the long side of the flake-like composition, the length of the point corresponding to the long side of the rectangular flake-like composition was measured. The measurements showed that the flake compositions with thicknesses in the range of 1 μm to 80 μm and lengths of the long sides in the range of 5 μm to 1200 μm. These obtained flake-like composition are desirable for applications such as bright pigments, paints, linings, coatings and reinforcement materials.

The flake-like composition shown in FIG. 8 was analyzed by X-ray diffraction (XRD) spectrum, and it was found that the flake-like composition consists essentially only of amorphous material. This is considered to be because the molten raw material which flows out of the hole of the tammann tube is rapidly cooled, resulting in an amorphous state due to the lack of enough time to arrange atoms.

The raw materials containing waste materials discharged from coal-fueled thermal power plants that have been melted and then solidified by cooling (including natural cooling) are also considered useful regardless of shape, since the solidified materials can be melted again to form fibers or flake-like compositions. In this case, too, the raw material contains $SiO_2$, $Al_2O_3$, and CaO as components, and the total content of $SiO_2$ and $Al_2O_3$ in the raw material is preferably between 45 and 75% by mass, and between 46 and 63% by mass is more preferred.

INDUSTRIAL APPLICABILITY

Flake-like compositions of the present invention can be used as glitter pigments, paints, linings, coatings and reinforcements.

EXPLANATIONS OF LETTERS OR NUMERALS

1 ELECTRIC FURNACE
2 TAMMANN TUBE
3 SUSPENSION ROD
4 THROUGH HOLE
D OUTER DIAMETER OF ELECTRIC FURNACE
H HEIGHT OF ELECTRIC FURNACE
d INNER DIAMETER OF THROUGH HOLE

The invention claimed is:

1. A process for producing a flake shaped composition material, the process comprising the steps of:
   i) heating a raw material containing waste material generated from a coal-fueled thermal power plant to a temperature of 1300° C. or higher in a heating chamber of a furnace, wherein the heating chamber comprises a tubular lumen penetrating through the furnace; and
   ii) causing said heated raw material to drip downwardly from the tubular lumen of the heating chamber and solidify into spherical material; and
   iii) subsequently, pulverizing said spherical material into flake shaped particles, wherein in said raw material, a total content of $SiO_2$ and $Al_2O_3$ in said raw material is between 46% by mass and 62% by mass, a content of $SiO_2$ is 33 to 52% by mass, and a content of $Al_2O_3$ is 8 to 13% by mass.

2. The method for producing a flake shaped composition material according to claim 1, wherein said waste material includes waste material generated from integrated coal gasification combined cycle (IGCC) power generation.

3. The method for producing a flake shaped composition material according to claim 1, wherein a mass ratio of the amount of $Al_2O_3$ to a total amount of $Al_2O_3$ and $SiO_2$ ($Al_2O_3/(Al_2O_3+SiO_2)$) is 0.15 to 0.28.

4. The method for producing a flake shaped composition material according to claim 1, wherein a total content of CaO in said raw material is from 8 to 34% by mass.

5. The method for producing a flake shaped composition material according to claim 1, further comprising a step of mixing waste materials to obtain said raw material so that in said raw material, the total content of $SiO_2$ and $Al_2O_3$ is between 46% by mass and 62% by mass, the content of $SiO_2$ is 33 to 52% by mass, and the content of $Al_2O_3$ is 8 to 13% by mass, prior to the heating step.

6. The method for producing a flake shaped composition material according to claim 1, further comprising the steps of:
   obtaining waste materials generated from a coal-fueled thermal power plant; and
   mixing said waste materials to obtain said raw material so that in said raw material, the total content of $SiO_2$ and $Al_2O_3$ is between 46% 62% by mass, the content of $SiO_2$ is 33 to 52% by mass, and the content of $Al_2O_3$ is 8 to 13% by mass, prior to the heating step.

* * * * *